United States Patent
Farooq

(10) Patent No.: US 11,457,375 B2
(45) Date of Patent: Sep. 27, 2022

(54) MONITORING NETWORK FUNCTIONS

(71) Applicant: T-Mobile USA, Inc., Bellevue, WA (US)

(72) Inventor: Muhammad Adnan Farooq, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 154 days.

(21) Appl. No.: 16/809,084

(22) Filed: Mar. 4, 2020

(65) Prior Publication Data

US 2020/0314672 A1    Oct. 1, 2020

Related U.S. Application Data

(60) Provisional application No. 62/825,974, filed on Mar. 29, 2019.

(51) Int. Cl.
*H04W 24/08*    (2009.01)
*H04L 67/1097*    (2022.01)

(52) U.S. Cl.
CPC ......... *H04W 24/08* (2013.01); *H04L 67/1097* (2013.01)

(58) Field of Classification Search
CPC ............................. H04W 24/08; H04L 67/1097
See application file for complete search history.

(56) References Cited

U.S. PATENT DOCUMENTS

| 2020/0296606 A1* | 9/2020 | Mendoza | H04L 67/1095 |
| 2021/0176650 A1* | 6/2021 | Wang | H04W 8/14 |
| 2021/0258861 A1* | 8/2021 | Wang | H04L 67/51 |

OTHER PUBLICATIONS

"3rd Generation Partnership Project; Technical Specification Group Services and System Aspects; Architecture enhancements for 5G System (5GS) to support network data analytics services (Release 16)", 3GPP Standard; Technical Specification; 3GPP TS 23.288, No. V0.3.0, 3rd Generation Partnership Project, Mar. 23, 2019, pp. 1-44.

(Continued)

*Primary Examiner* — Kodzovi Acolatse
*Assistant Examiner* — Abdeltif Ajid
(74) *Attorney, Agent, or Firm* — Lee & Hayes, P.C.

(57) ABSTRACT

The methods, systems, and computer readable media discussed herein are directed to maintaining status information of network functions (NFs) associated with one or more network function repository functions (NRFs). An NRF, which may be one of a plurality of NRFs belonging to a group of NRFs, maybe queried. The plurality of NRFs may be synchronized to each other, and the group of NRFs may be one of a plurality of groups of NRFs. One or more NFs may be registered with the NRF, and each NRF of the plurality of NRFs may have one or more corresponding NFs registered to it. The NRF may maintain status information of the one or more NFs registered to the NRF. The NRF may collect information associated with querying of NFs by another NF, and send statistical data based on the collected information to a user interface (UI) of an external device to be displayed on the UI.

20 Claims, 5 Drawing Sheets

(56) References Cited

OTHER PUBLICATIONS

Ericsson, "Pseudo-CR on Service Discovery and Registration using NRF service", retrieved on Aug. 25, 2017 at <<http://www.3gpp.org/ftp/tsg_ct/WG4_protocollars ex-CN4/TSGCT4 79 Krakow/Docs/>>, vol. CT WG4, No. Krakow, Poland; Aug. 21, 2017-Aug. 25, 2017, 3GPP Draft, c4-174332WAS4236WAS4083_Solution_ using NRF service, 3rd Generation Partnership Project (3GPP), Aug. 25, 2017, 4 pages.

PCT Search Report and Written Opinion dated Jun. 9, 2020 for PCT Application No. PCT/US2020/020997, 15 pages.

International Report on Preliminary Patentability for PCT Application No. PCT/US20/20997, dated Oct. 14, 2021, 10 pages.

* cited by examiner

MONITORING NETWORK FUNCTIONS

CROSS-REFERENCE TO RELATED APPLICATIONS

This application is a non-provisional of, and claims priority to and the benefit of, U.S. Provisional Patent Application Ser. No. 62/825,974, filed Mar. 29, 2019 and entitled "MONITORING NETWORK FUNCTIONS" the entirety of which is incorporated herein by reference.

BACKGROUND

Modern telecommunications systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. As increased capabilities of user equipment (UE) enable greater data consumption, placing increased demands on networks, new networks with higher capabilities have been developed. The 5G telecommunications technologies are the next generation mobile networks that are designed to combine both an evolution and revolution of the existing LTE/LTE-A mobile networks to provide a much higher connectivity, greater throughput, much lower latency, and ultra-high reliability to support new use cases and applications. Currently, a command-line (CLI) interface to a network function (NF) repository function (NRF) is used to retrieve NF status information.

BRIEF DESCRIPTION OF THE DRAWINGS

Objects, features, and advantages of various aspects will become more apparent when taken in conjunction with the following description and drawings. Identical reference numerals have been used, where possible, to designate identical features that are common to the figures. The attached drawings are for purposes of illustration and are not necessarily to scale.

DETAILED DESCRIPTION

Figure 1:
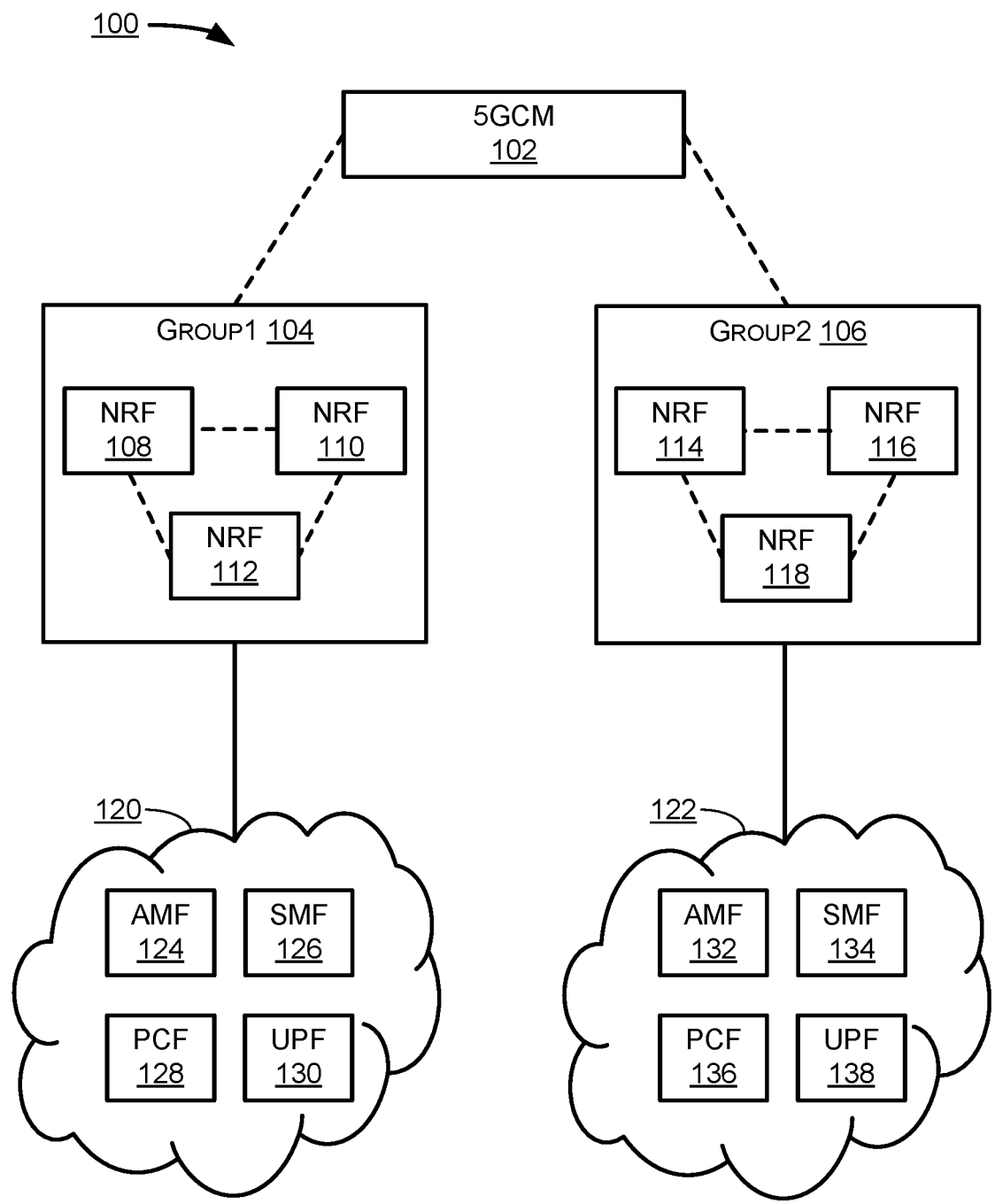
FIG. 1 illustrates an example 5GCM architectural layout in which the 5GCM can query two NRFs.

Example embodiments described or shown herein are provided for purposes of example only. Statements made herein may be specific to a particular example embodiment, or a specific aspect of that example embodiment, and should not be construed as limiting other example embodiments described herein. Features described with regard to one type of example embodiment may be applicable to other types of example embodiments as well. The features discussed herein are not limited to the specific usage scenarios with respect to which they are discussed.

Throughout this description, some aspects are described in terms that would ordinarily be implemented as software programs. Those skilled in the art will readily recognize that the equivalent of such software can also be constructed in hardware, firmware, or micro-code. The present description is directed in particular to algorithms and systems forming part of, or cooperating more directly with, systems and methods described herein. Aspects not specifically shown or described herein of such algorithms and systems, and hardware or software for producing and otherwise processing signals or data involved therewith, can be selected from systems, algorithms, components, and elements known in the art.

A carrier's service area (e.g., nationwide, or the lower 48) can be divided into regions, e.g., 5, 6, 7, 8, or 9 regions. In a network including multiple Network Function (NF) Repository Functions (NRFs), one, more than one, or all of the NRFs can perform associated functions described herein, e.g., aggregating information.

An NRF may maintain information on the status of Network Functions (NFs) registered to that NRF (e.g., via the Nnrf_NFManagement service, which allows a Network Function Instance in the serving Public Land Mobile Network (PLMN) to register, update or deregister its profile in the local NRF). The NRF aggregates this information and provides it to a user interface (UI). For example, the NRF can send aggregated data to an external device, such as a Web server or other back-end. The UI can then present the data to network operations personnel, e.g., on a map or bar chart presented via a Web page.

An NRF in 5G architecture keeps track of available Network Functions (NFs) in 5G Core that can provide a specific service. This is accomplished through a Registration procedure of a specific NF to the NRF when it goes online. NFs requiring the service of other NFs then query the NRF to discover (e.g., via the Nnrf_NFDiscovery service) the available NFs that can provide the requested service. In a 5G network (e.g., using hundreds or even thousands of NF's), maintaining NF profile data is a responsibility of NRF. To discover NF, consumer NFs use an NRF's data.

A Graphical User Interface (GUI), or other UI based on data from the NRF of registered NFs' profile data, may be used by a network operation center (NOC) and Operations to keep track of profiles of NFs, which may ease profile management and discovery. 5G Core Monitoring (5GCM) may perform UI functions (front end, back end, or both) such as those described herein, and may query one or more NRFs, e.g., one NRF at any given time.

Throughout this discussion, references to a single NF, NRF, 5GCM, or other network node also encompass multiple NFs, NRFs, or 5GCMs arranged so that one of the NFs, NRFs, or 5GCMs is active and the other(s) is (are) hot spares or other standby/backup nodes, or so that the NFs, NRFs, or 5GCMs are pooled (e.g., a round-robin or other load-balancing technique is used to distribute requests between the NFs, NRFs, or 5GCMs). In some examples, synchronization protocols or formats such as rsync, scp (ssh), network file system (NFS), or SyncML may be used between nodes.

FIG. 1 illustrates an example 5GCM architectural layout 100 in which the 5GCM 102 can query two NRF groups, Group1 104 and Group2 106. Each NRF group is implemented using three synchronized NRFs (NRFs 108, 110, and 112 for the Group1 104, and NRFs 114, 116, and 118 for Group2 106) in such an active/standby or pooled configuration.

An NRF may be associated with a particular region, and the 5GCM 102 may query multiple NRFs and aggregate the data therefrom to provide a combined representation of information from multiple regions, e.g. geographical regions. Additionally, or alternatively, one or more NRFs may aggregate information from other NRFs and provide the aggregated information to the 5GCM 102.

The Group1 104 and the NRF Group2 104 may be communicatively coupled to a first set of NFs (Set1) 120 and a second set of NFs (Set2) 122, respectively, each of which may include various NFs. In this example, the Set1 120 is illustrated to include an Access and Mobility Management Function (AMF) 124, a Session Management Function (SMF) 126, a Policy Control Function (PCF) 128, and a User Plane Function (UPF) 130, and the Set2 122 is illustrated to similarly include an AMF 132, an SMF 134, a PCF 136, and a UPF 138. The NRFs may collect load and capacity data for registered NFs, and/or collect the heartbeat statistics of NFs (e.g., registered or otherwise), e.g., how often NFs send heartbeats.

The UI may provide a numerical display of how many NFs have been suspended from registration with the NRF (e.g., zero=green). For example, after two or three heartbeat failures, the NRF may suspend an NF. The NRF may also instruct the NFs how often to send heartbeat. The UI may also permit monitoring the NRF itself. For examples, the UI may permit monitoring the NFs but not the NRF itself or creating a trouble ticket describing an issue encountered in an NF. For example, the UI may auto-populate a new-ticket form with information received from the NRF.

For example, in 5G, NFs, such as any one or more of NFs in the Set1 120 and/or the Set2 122, may register, de-register, and/or update their profiles with the NRF, such as any one or more of the NRFs in the Group1 104 and/or the Group2 106, once the NFs are instantiated. This permits other NFs to discover an NF that provides particular services. The UI may present information of discovery problems. For example, the UI may show how many NFs are trying to discover, or have discovered, other NFs, and the NRF can log request timestamps and present them via the UI.

The UI may have one or more sections, e.g., presented as tabs. Example tabs and data, or statistical data, or information displayed on those tabs may include any of: a) discovery data such as a number of NFs that are currently discovering, identities of NFs that are currently discovering, a number of NFs being discovered, identities of NFs being discovered; b) registration data such as a number of NFs that are currently registered to a particular NRF(s), identity or identities of the particular NRF(s), identities of NFs that are currently registered to the particular NRF(s), a number of NFs that are known but unregistered, a number of NFs that are suspended, heartbeat statistics of NFs; c) security data such as a number NFs that have completed OAuth2 authentication; d) status notification data such as a number of NFs that are currently subscribed to receive NRF notifications, e) NF subscription data such as a number of NFs that are subscribed to an NRF to receive updates regarding the status of other NFs; and f) status update data such as a number of NFs that NRF is subscribed to, and from which NRF receives updates.

An NF may provide load and capacity information to NRF, e.g., periodically or upon request. For example, a first NF, such as the SMF 126, running at 30% load (CPU, memory, storage, etc.) may experience a sudden increase in load to 75%. 75%, or the delta of 45%, may exceed a threshold to update the NRF, such as the NRF 108, and as a result, the SMF 126 may provide updated information to the NRF 108. The NRF 108 may then forward this information to the UI, which may display the current loads for NFs that are heavily loaded (e.g., the SMF 126). The UI may also omit displaying data that does not meet predetermined thresholds (e.g., refraining to show NFs that are not heavily loaded because no action is required with respect to those NFs, where the need for action is defined by the predetermined thresholds).

In various prior schemes, a command-line (CLI) interface to the NRF is used to retrieve NF status information. Embodiments disclosed herein may have at least one of the following features that are unlike at least some of these prior schemes: no login to the NRF is required; the UI can fetch and display data on a regular, scheduled basis (e.g., every 5s); the UI can update substantially immediately when an NF malfunctions or becomes unavailable; the UI can present toast notifications or change UI-element colors to indicate status changes (e.g., NF failure); the UI does not require static configuration of the NFs to be reported (because the UI only needs to connect to the NRF); the UI can retrieve information from the NRF via HTTP (e.g., 5G service-based interface, SBI), which is more likely to pass through firewalls than Simple Network Management Protocol (SNMP) or other prior management protocols; a single query to the NRF can return results for some or all the NFs registered (or that were, until recently, registered) to the NRF.

Each individual NF may send its own alarms/status via its own tool, and the UI may be used in conjunction with such tools. A back end (e.g., a database server, Web server, or extract-transform-load, ETL, node) may fetch information from an NRF, and a front end (e.g., a Web server or a single-page application or other JavaScript code running in a browser) may retrieve the data from the back end and presents it. The NRF may perform the aggregation so that the UI doesn't need to perform that task. The NRF may also buffer data and provide the UI (e.g., back end) with current status. Further, only one set of login credentials may be used (e.g., to login to the NRF), which removes the need in some prior schemes to manage credentials for multiple NFs.

The NRF may, upon request from the back end or other UI component, fetch the profile of a specific NF, and the UI may present the profile such as key performance indicators (KPIs) or alarms.

For example, if the SMF 126 tries to connect to the NRF 110, and the NRF 110 responds with a 4xx Bad Request response (e.g., 400, 401, 402), the UI may retrieve from the NRF 110 and present the error messages sent by the NRF 110 or the SMF 126. The UI may also present the number of errors per code type.

In another example, an AMF, such as the AMF 124, may send an Nnrf_NFDiscovery query to one of the NRFs of Group1 104 to discover an SMF, such as the SMF 134. The UI may present discovery information, such as which NF is trying to discover which, % successful/failed, and/or other statistics. The AMF 124 may also attempt to authenticate to an NRF using OAuth2. If the token exchange fails, the NRF may send a 4xx response, and the UI may display all NFs that have received a 4xx. The UI may also receive commands, e.g., overriding NF profile parameters such as load, capacity, or priority at the NRF, and forward those commands to the NRF.

Figure 2:
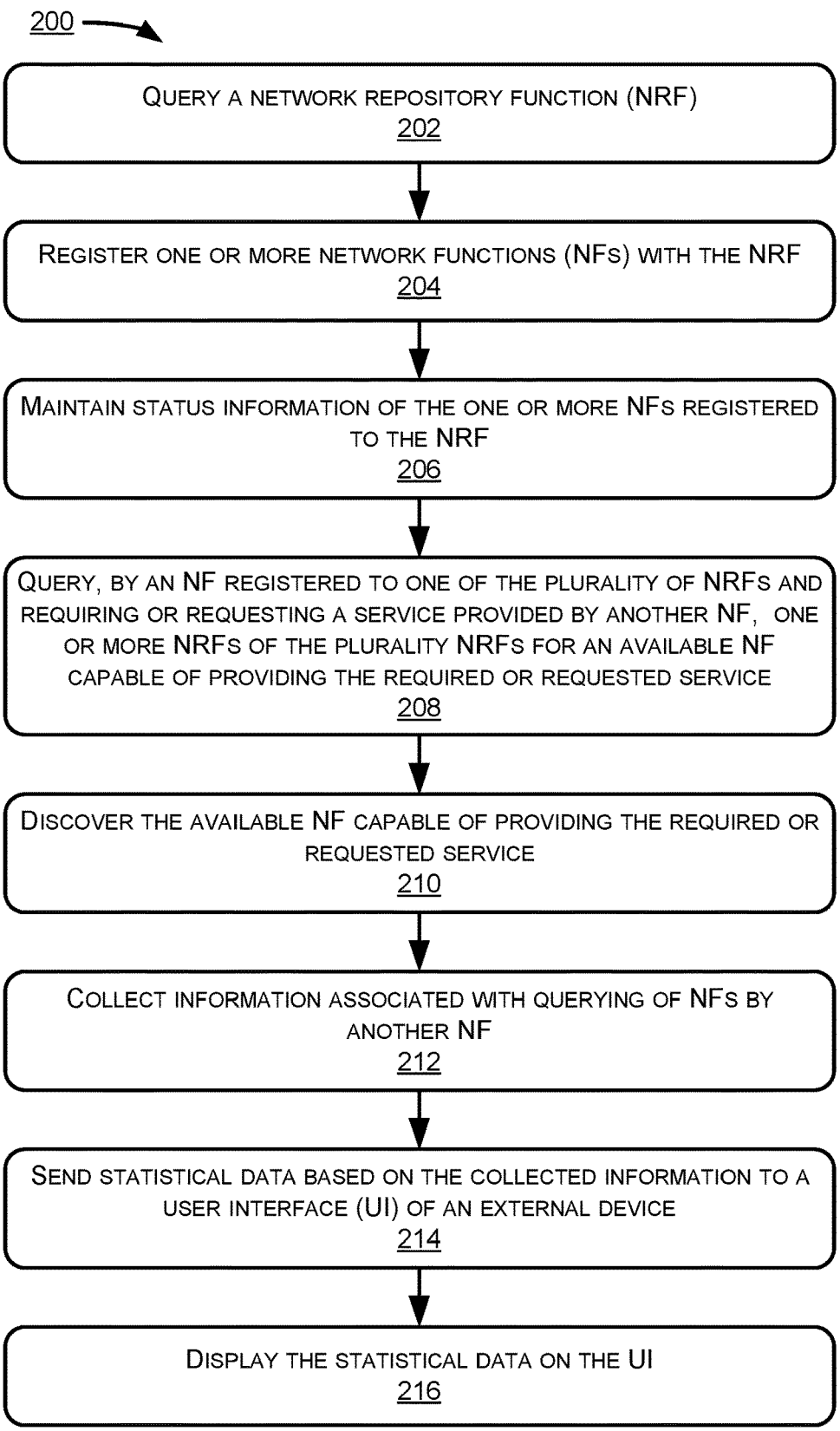
FIG. 2 illustrates an example process for analyzing data associated with NFs and NRFs and performing related tasks.

FIG. 2 illustrates an example process 200 for analyzing data associated with NFs and NRFs and performing related tasks.

At block 202, a network repository function (NRF) maybe queried. As discussed above with regard to FIG. 1, the NRF may be one of a plurality of NRFs belonging to a group of NRFs, where the plurality of NRFs may be synchronized to each other, and the group of NRFs may be one of a plurality of groups of NRFs. At block 204, one or more network functions (NFs) may be registered with the NRF. Additionally, each NRF of the plurality of NRFs may have one or more corresponding NFs registered to it. At block 206, the NRF maintains status information of the one or more NFs registered to the NRF. At block 208, an NF, which is registered to one of the plurality of NRFs and requiring or requesting a service provided by another NF, may query one or more NRFs of the plurality NRFs for an available NF that is capable of providing the required or requested service. At block 210, the NF may discover the available NF capable of providing the required or requested service. At block 212, the NRF may collect information associated with querying of NFs by another NF, and send statistical data based on the collected information to a user interface (UI) of an external device at block 214. At block 216, the statistical data may be displayed on the UI. As described above with regard to FIG. 1, the statistical data may include at least one of discovery data, registration data, security data, status notification data, NF subscription data, or status update data.

Figure 3:
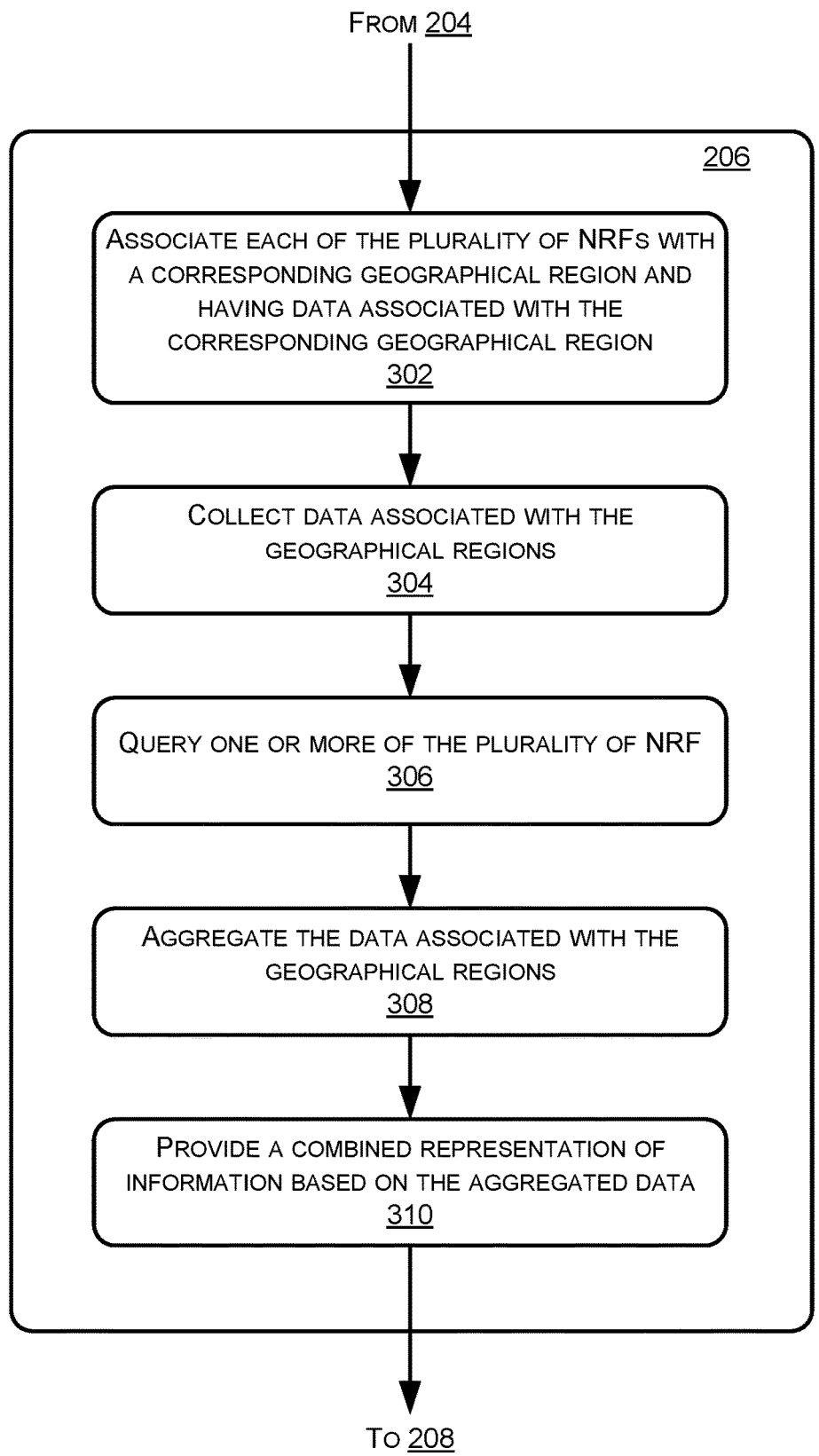
FIG. 3 illustrates an example detailed process of one of the blocks of FIG. 2.

FIG. 3 illustrates an example detailed process of block 206 of FIG. 2.

At block 302, each of the plurality of NRFs may be associated with a corresponding geographical region and at block 304, data associated with the geographical regions may be collected. One or more of the plurality of NRFs may be queried at block 306 and the data associated with geographical regions may be aggregated at block 308. At block 310, a combined representation of information based on the aggregated data may be provided.

Figure 4:
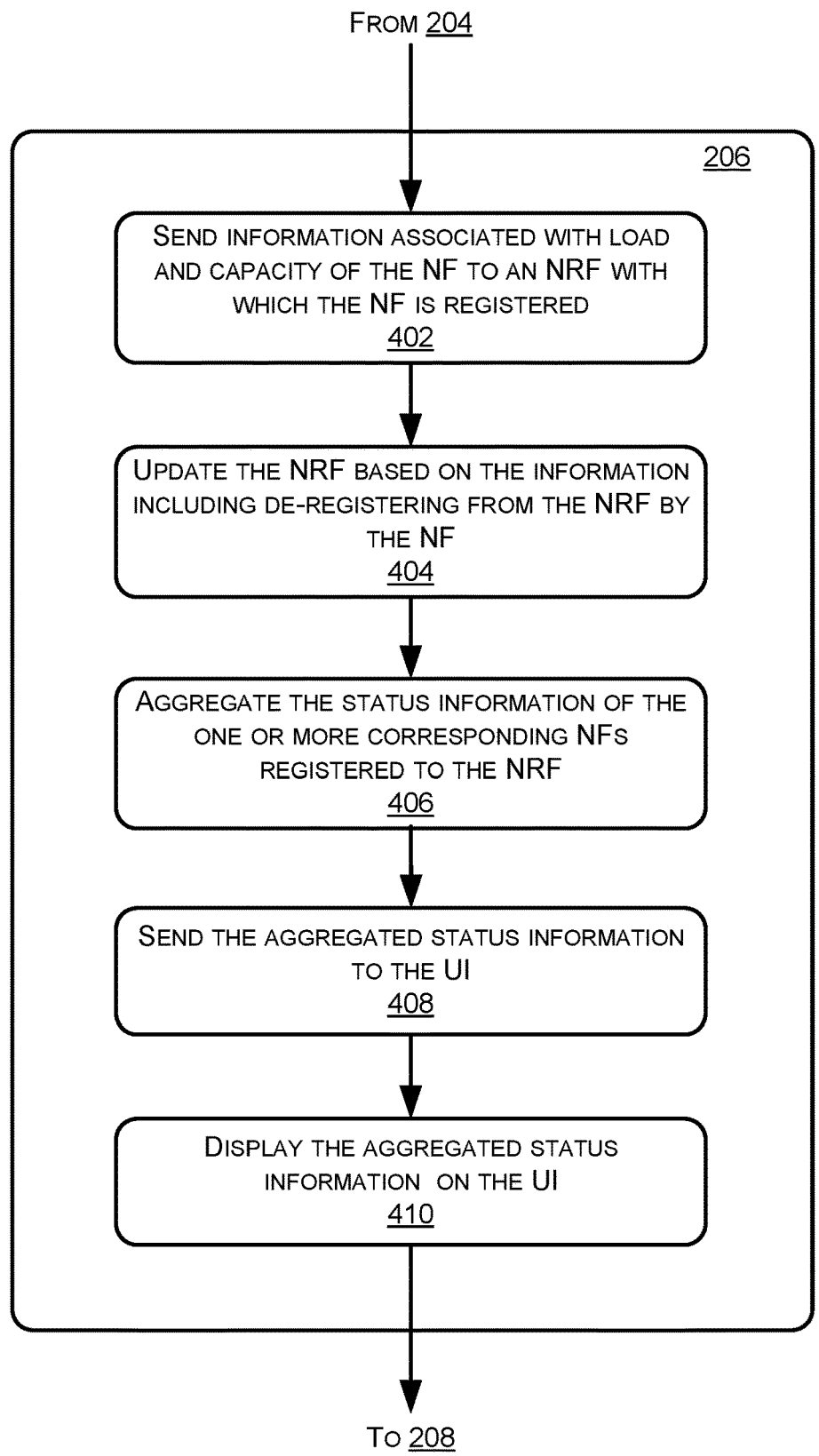
FIG. 4 illustrates another example detailed process of one of the blocks of FIG. 2.

FIG. 4 illustrates another example detailed process of block 206 of FIG. 2.

Additionally, or alternatively, to the process described with regard to FIG. 3, an NF may send information associated with load and capacity of the NF to an NRF with which the NF is registered at block 402 and update the NRF based on the information including de-registering from the NRF by the NF at block 404. The NRF may then aggregate the status information of the one or more corresponding NFs registered to the NRF at block 406, send the aggregated status information to the UI at block 408, and causing the aggregated status information to be displayed on the UI at block 410.

Figure 5:
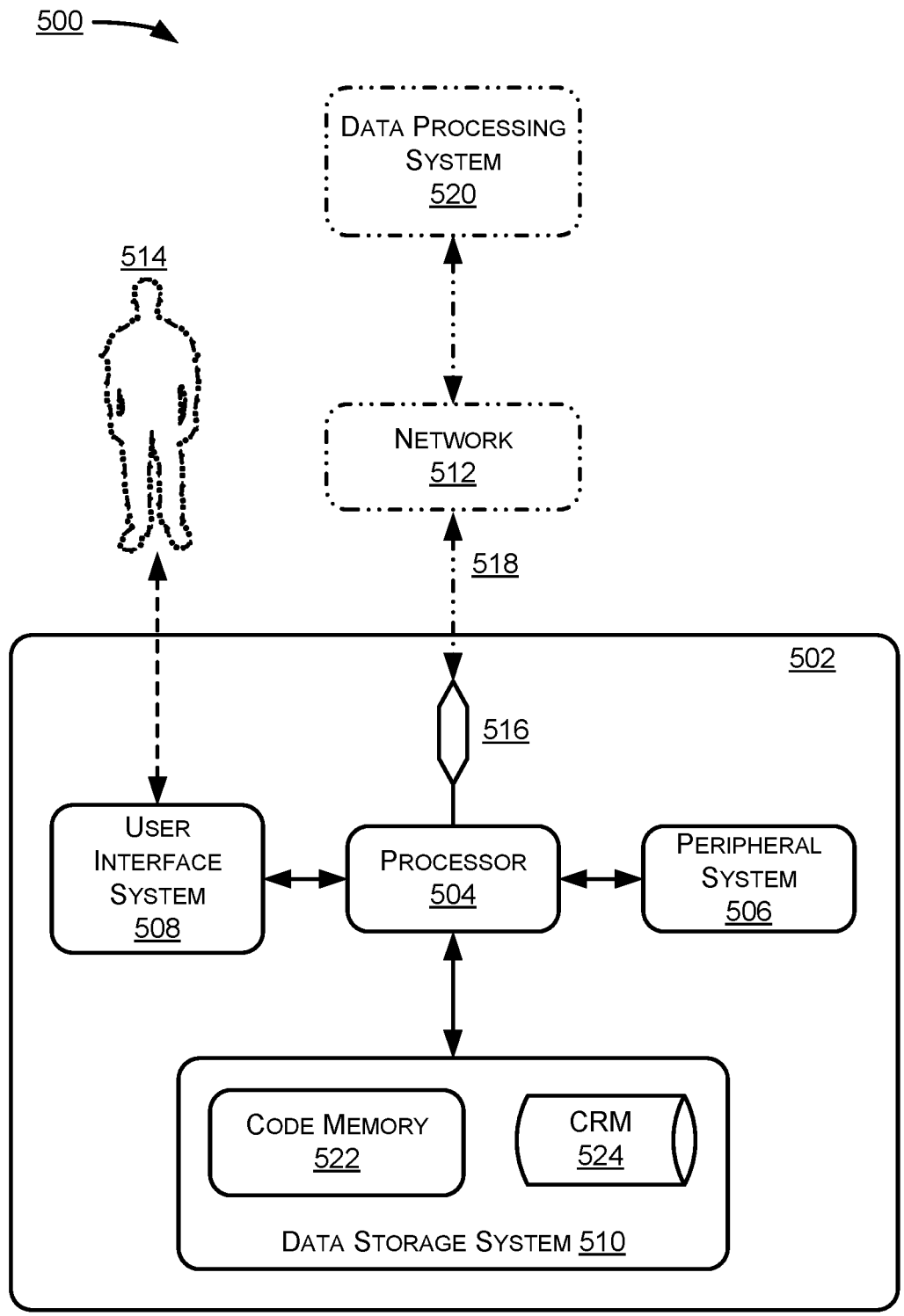
FIG. 5 is a high-level diagram showing the components of a data-processing system.

FIG. 5 is a high-level diagram 500 illustrating the components of an example data-processing system 502 for analyzing data and performing other analyses described herein, and related components. The system 502 includes a processor 504, a peripheral system 506, a user interface system 508, and a data storage system 510. The peripheral system 506, the user interface system 508, and the data storage system 510 are communicatively connected to the processor 504, and may or may not be colocated with the processor 504. The processor 504 can be communicatively connected to the network 512 (shown in phantom), e.g., via the Internet, a leased line, or a cellular network, as discussed below. The network 512 may be an example of internetwork 518. An NRF, NF, or 5GCM as discussed above, or other network nodes described herein may each include one or more of systems 502, 506, 508, 510, and may each connect to one or more network(s) 512. The processor 504, and other processing devices described herein, may each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Some example systems and techniques described herein may permit computing devices to communicate via telecommunications networks. The term "session" as used herein includes a communications path via at least one telecommunications network for exchange of data among two or more computing devices, referred to for brevity as "terminals." Example sessions include voice and video calls, e.g., by which human beings converse, a data communication session, e.g., between two electronic systems or between an electronic system and a human being, or a Rich Communication Services (RCS) session.

Telecommunications networks, such as the network 512 or a component thereof, may include an application or core network (e.g., an Internet Protocol, IP, Multimedia Subsystem, IMS, network) operated by one or more service providers ("carriers"), such as one or more cellular-telephony providers. The application network is connected via access networks, e.g., serving networks or home networks to terminals. Terminals can be operated by users ("subscribers") or can be autonomous. Example access networks carrying traffic of sessions can include second-generation (2G), third-generation (3G), or fourth-generation (4G) cellular networks; wired data networks such as Ethernet, Asynchronous Transfer Mode (ATM), Public Switched Telephone Network (PSTN), Data Over Cable Service Interface Specification (DOCSIS), digital subscriber line (DSL), or optical networks (e.g., Synchronous Optical NETwork, SONET); or wireless data networks such as Institute of Electrical and Electronics Engineers (IEEE) 802.11 (WIFI), 802.15.1 (BLUETOOTH), or 802.16 (WIMAX) networks carrying voice over Internet Protocol (VoIP) (e.g., VoWIFI) calls.

Examples may include or be interoperable with Long Term Evolution (LTE) or 3GPP fifth-generation New Radio (5G NR) cellular networks, or any future IP-based cellular networks, carrying Voice over LTE (VoLTE) sessions using Session Initiation Protocol (SIP) signaling. The network 212 may provide wide-area wireless coverage using a technology such as GSM or other 2G cellular technologies; the Universal Mobile Telecommunications System (UMTS) or other 3G cellular technologies; or LTE or other 4G cellular technologies. Example cellular-network technologies can include Code Division Multiple Access (CDMA), Time Division Multiple Access (TDMA), Evolution Data Optimized (EVDO), Advanced LTE (LTE+), Generic Access Network (GAN), Unlicensed Mobile Access (UMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), GSM/EDGE RAN (GERAN), Universal Terrestrial RAN (UTRAN), or evolved UMTS Terrestrial RAN (E UTRAN).

The processor 504 may be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise.

The phrase "communicatively connected" and "communicatively coupled" includes any type of connection, wired or wireless, for communicating data between devices or processors. These devices or processors can be located in physical proximity or not. For example, subsystems such as the peripheral system 506, the user interface system 508, and the data storage system 510 are shown separately from the processor 504 but may be stored, housed, or contained completely or partially within the processor 504.

The peripheral system 506 may include or be communicatively connected with one or more devices configured or otherwise adapted to provide digital content records to the processor 504 or to take action in response to the processor 504. For example, the peripheral system 506 may include digital still cameras, digital video cameras, cellular phones, or other data processors. The processor 504, upon receipt of digital content records from a device in the peripheral system 506, can store such digital content records in the data storage system 510.

The user interface system 508 may convey information in either direction, or in both directions, between a user 514 and the processor 504 or other components of the system 502. The user interface system 508 can include a mouse, a keyboard, another computer (connected, e.g., via a network or a null-modem cable), or any device or combination of devices from which data is input to the processor 504. The user interface system 508 also may include a display device, a processor-accessible memory, or any device or combination of devices to which data is output by the processor 504. The user interface system 508 and the data storage system 510 may be remote systems separate from the processor 504 but may share a processor-accessible memory.

In various aspects, the processor 504 may include or be connected to the communications interface 516 that is coupled via a network link 518 (shown in phantom) to the network 512. The network link 518 may include a wired or wireless communication connection. For example, the communications interface 516 may include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WIFI or GSM. The communications interface 516 may send and receive electrical, electromagnetic, or optical signals that carry digital or analog data streams representing various types of information across the network link 518 to the network 512. The network link 518 may be connected to the network 512 via a switch, gateway, hub, router, or other networking device.

In various aspects, the system 502 may communicate, e.g., via the network 512, with a data processing system 520, which may include the same types of components as the system 502 but is not required to be identical thereto. The systems 502 and 520 may be communicatively connected via the network 512. Each of the system 502 and 520 may execute computer program instructions to conduct at least a portion of an exchange described herein.

The processor 504 may implement processes of various aspects described herein. The processor 504 and related components can, e.g., carry out processes for collecting data from NFs (e.g., at an NRF), aggregating data (e.g., at an NRF), providing aggregated data to a UI, or presenting representations of the aggregated data via the UI. For example, the system 502 may be an NRF configured to collect data from NFs and transmit it to a UI system, and the system 520 may be the UI system.

The processor 504 may send messages and receive data, including program code, through the network 512, the network link 518, and the communications interface 516. For example, a server can store requested code for an application program (e.g., a JAVA applet) on a tangible non-volatile computer-readable storage medium to which it is connected. The server may retrieve the code from the medium and transmit it through the network 512 to the communications interface 516. The received code may be executed by the processor 504 as it is received or stored in the data storage system 510 for later execution.

The data storage system 510 can include or be communicatively connected with one or more processor-accessible memories configured or otherwise adapted to store information. The memories can be, e.g., within a chassis or as parts of a distributed system. The phrase "processor-accessible memory" is intended to include any data storage device to or from which the processor 504 may transfer data (using appropriate components of the peripheral system 506), whether volatile or nonvolatile; removable or fixed; electronic, magnetic, optical, chemical, mechanical, or otherwise. Example processor-accessible memories include but are not limited to: registers, floppy disks, hard disks, solid-state drives (SSDs), tapes, bar codes, Compact Discs, DVDs, read-only memories (ROM), erasable programmable read-only memories (EPROM, EEPROM, or Flash), and random-access memories (RAMs). One of the processor-accessible memories in the data storage system 510 may be a tangible non-transitory computer-readable storage medium, i.e., a non-transitory device or article of manufacture that participates in storing instructions that can be provided to the processor 504 for execution. One of the processor-accessible memories in the data storage system 510 may be a non-volatile memory in a Subscriber Identity Module (SIM) card.

The data storage system 510 may include code memory 522, e.g., a RAM, and computer-readable medium (CRM) 524, e.g., a tangible computer-readable medium (e.g., a hard drive or other rotational storage device, or a Flash drive or other nonvolatile storage device). Computer program instructions may be read into the code memory 522 from the CRM 524. The processor 504 may then execute one or more sequences of the computer program instructions loaded into the code memory 522, as a result performing process steps described herein. In this way, the processor 504 may carry out a computer implemented process. For example, steps of methods described herein, blocks of the flowchart illustrations or block diagrams herein, and combinations of those, may be implemented by computer program instructions. The code memory 522 may also store data or store only code. By using high-speed nonvolatile memory, the CRM 524 may also function as the code memory 522, and a separate code memory 522 may not be used.

In the illustrated example, the systems 502 or 520 can be computing nodes in a cluster computing system, e.g., a cloud service or other cluster system ("computing cluster" or "cluster") having several discrete computing nodes (the systems 502, 520) that work together to accomplish a computing task assigned to the cluster as a whole. At least one of the systems 502 or 520 may be a client of a cluster and may submit jobs to the cluster and/or receive job results from the cluster. Nodes in the cluster may, e.g., share resources, balance load, increase performance, and/or provide fail-over support and/or redundancy. Additionally, or alternatively, at least one of the systems 502 or 520 may communicate with the cluster, e.g., with a load-balancing or job-coordination device of the cluster, and the cluster or components thereof may route transmissions to individual nodes.

Some cluster-based systems may have all or a portion of the cluster deployed in the cloud. Cloud computing allows for computing resources to be provided as services rather than a deliverable product. For example, in a cloud-computing environment, resources such as computing power, software, information, and/or network connectivity are provided (for example, through a rental agreement) over a network, such as the Internet. As used herein, the term "computing" used with reference to computing clusters, nodes, and jobs refers generally to computation, data manipulation, and/or other programmatically-controlled operations. The term "resource" used with reference to clusters, nodes, and jobs refers generally to any commodity and/or service provided by the cluster for use by jobs. Resources can include processor cycles, disk space, random-access memory (RAM) space, network bandwidth (uplink, downlink, or both), prioritized network channels such as those used for communications with quality-of-service (QoS) guarantees, backup tape space and/or mounting/unmounting services, electrical power, etc.

Furthermore, various aspects herein may be embodied as computer program products including a computer readable program code ("program code") stored on a computer readable medium, e.g., a tangible non-transitory computer storage medium or a communication medium. A computer storage medium can include tangible storage units such as volatile memory, nonvolatile memory, or other persistent or auxiliary computer storage media, removable and non-removable computer storage media implemented in any method or technology for storage of information such as computer-readable instructions, data structures, program modules, or other data. A computer storage medium can be manufactured as is conventional for such articles, e.g., by pressing a CD-ROM or electronically writing data into a Flash memory. In contrast to computer storage media, communication media may embody computer-readable instructions, data structures, program modules, or other data in a modulated data signal, such as a carrier wave or other transmission mechanism. As defined herein, computer storage media do not include communication media. That is, computer storage media do not include communications media consisting solely of a modulated data signal, a carrier wave, or a propagated signal, per se.

The program code includes computer program instructions that can be loaded into the processor 504 (and possibly also other processors), and that, when loaded into the processor 504, cause functions, acts, or operational steps of various aspects herein to be performed by the processor 504 (or other processors). The computer program code for carrying out operations for various aspects described herein may be written in any combination of one or more programming language(s) and can be loaded from the CRM 524 into the code memory 522 for execution. The program code may execute, e.g., entirely on the processor 504, partly on the processor 504 and partly on a remote computer connected to the network 512, or entirely on the remote computer.

A "control unit" as described herein includes the processor 504. A control unit may also include, if required, the data storage system 510 or portions thereof. For example, a control unit may include a CPU or DSP (the processor 504) and a computer storage medium or other tangible, non-transitory computer-readable medium storing instructions executable by that CPU or DSP to cause that CPU or DSP to perform functions described herein. Additionally, or alternatively, a control unit may include an ASIC, FPGA, or other logic device(s) wired (e.g., physically or via blown fuses or logic-cell configuration data) to perform functions described herein. Control units, including ASICs or other devices physically configured to perform operations described herein, may not include computer-readable media (e.g., the CRM 524) storing processor-executable instructions.

Steps of various methods described herein can be performed in any order except when otherwise specified, or when data from an earlier step is used in a later step. Example method(s) described herein are not limited to being carried out by components particularly identified in discussions of those methods.

In view of the foregoing, various aspects provide monitoring of network functions. A technical effect is to retrieve information regarding real-time NF load. A further technical effect is to present a visual representation of network status on an electronic display.

This disclosure is inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

Although some features and examples herein have been described in language specific to structural features or methodological steps, it is to be understood that the subject matter herein is not necessarily limited to the specific features or steps described. For example, the operations of example processes herein are illustrated in individual blocks and logical flows thereof and are summarized with reference to those blocks. The order in which the operations are described is not intended to be construed as a limitation unless otherwise indicated, and any number of the described operations can be executed in any order, combined in any order, subdivided into multiple sub-operations, or executed in parallel to implement the described processes. For example, in alternative implementations included within the scope of the examples described herein, elements or functions can be deleted, or executed out of order from that shown or discussed, including substantially synchronously or in reverse order.

Each illustrated block can represent one or more operations that can be implemented in hardware, software, or a combination thereof. In the context of software, the operations described herein represent computer-executable instructions stored on at least one computer-readable medium that, when executed by one or more processors, enable the one or more processors to perform the recited operations. Accordingly, the methods and processes described above can be embodied in, and fully automated via, software code modules executed by one or more computers or processors. Generally, computer-executable instructions include routines, programs, objects, modules, code segments, components, data structures, and the like that perform particular functions or implement particular abstract data types. Some or all of the methods can additionally or alternatively be embodied in specialized computer hardware. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system." The described processes can be performed by resources associated with one or more computing systems

502, 520 or the processor 504, such as one or more internal or external CPUs or GPUs, or one or more pieces of hardware logic such as FPGAs, DSPs, or other types of accelerators.

Conditional language such as, among others, "can," "could," "might" or "may," unless specifically stated otherwise, are understood within the context to present that certain examples include, while other examples do not include, certain features, elements or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example.

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," and/or any of those phrases with "and/or" substituted for "or," unless specifically stated otherwise, is to be understood as signifying that an item, term, etc., can be either X, Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated. As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present.

Many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

What is claimed is:

1. A method comprising:
    querying a network function repository function (NRF), the NRF being one of a plurality of NRFs belonging to a group of NRFs;
    registering one or more network functions (NFs) with the NRF;
    maintaining, by the NRF, status information of the one or more NFs registered to the NRF;
    querying, by an NF registered to one of the plurality of NRFs and requiring a service provided by another NF, one or more NRFs of the plurality of NRFs for an available NF capable of providing the required service; and
    discovering, by the NF registered to the one of the plurality of NRFs, the available NF capable of providing the required service based on the status information of the available NF capable of providing the required service maintained at the one or more NRFs of the plurality of NRFs.

2. The method of claim 1, wherein the plurality of NRFs are synchronized to each other, each NRF of the plurality of NRFs having one or more corresponding NFs registered to it.

3. The method of claim 2, wherein the group of NRFs is one of a plurality of groups of NRFs.

4. The method of claim 1, further comprising:
    collecting information associated with querying of NFs by another NF;
    sending statistical data based on the collected information to a user interface (UI) of an external device; and
    causing the external device to display the statistical data.

5. The method of claim 4, wherein the statistical data includes at least one of:
    discovery data,
    registration data,
    security data,
    status notification data,
    NF subscription data, or
    status update data.

6. The method of claim 1, wherein each of the plurality of NRFs is associated with a corresponding geographical region and having data associated with the corresponding geographical region.

7. The method of claim 6, further comprising:
    querying one or more of the plurality of NRFs;
    aggregating the data associated with the geographical regions from the one or more of the plurality of NRFs; and
    providing a combined representation of information based on the aggregated data.

8. The method of claim 1, further comprising:
    sending, by an NF, information associated with load and capacity of the NF to an NRF with which the NF is registered; and
    updating the NRF by the NF based on the information, updating the NRF including de-registering, by the NF, from the NRF.

9. The method of claim 8, further comprising:
    aggregating, by the NRF, the status information of the one or more corresponding NFs registered to the NRF;
    sending, by the NRF, the aggregated status information to a user interface (UI) of an external device; and
    causing the external device to display the aggregated status information.

10. A system comprising:
a processor;
a user interface (UI) system communicatively coupled to the processor; and
a data storage system communicatively coupled to the processor, the data storage system including a computer-readable medium (CRM) storing thereon, computer-executable instructions that, when executed by the processor, cause the processor to perform operations, the operations comprising:
  querying a network function repository function (NRF), the NRF being one of a plurality of NRFs belonging to a group of NRFs;
  registering one or more network functions (NFs) with the NRF;
  maintaining, by the NRF, status information of the one or more NFs registered to the NRF;
  querying, by an NF registered to one of the plurality of NRFs and requiring a service provided by another NF, one or more NRFs of the plurality of NRFs for an available NF capable of providing the required service; and
  discovering, by the NF registered to the one of the plurality of NRFs, the available NF capable of providing the required service based on the status information of the available NF capable of providing the required service maintained at the one or more NRFs of the plurality of NRFs.

11. The system of claim 10, wherein the plurality of NRFs are synchronized to each other, each NRF of the plurality of NRFs having one or more corresponding NFs registered to it, and the group of NRFs is one of a plurality of groups of NRFs.

12. The system of claim 11, wherein the operations further comprise:
  collecting information associated with querying of NFs by another NF;
  sending statistical data based on the collected information to the UI system; and
  displaying the statistical data.

13. The system of claim 10, wherein each of the plurality of NRFs is associated with a corresponding geographical region and having data associated with the corresponding geographical region, and the operations further comprise:
  querying one or more of the plurality of NRFs;
  aggregating the data associated with corresponding geographical regions from the one or more of the plurality of NRFs; and
  providing a combined representation of information based on the aggregated data.

14. The system of claim 10, wherein the operations further comprise:
  sending, by an NF, information associated with load and capacity of the NF to an NRF with which the NF is registered;
  updating the NRF by the NF based on the information, updating the NRF including de-registering, by the NF, from the NRF;
  aggregating, by the NRF, the status information of the one or more corresponding NFs registered to the NRF;
  sending, by the NRF, the aggregated status information to the UI system; and
  displaying the aggregated status information.

15. A non-transitory computer-readable medium (CRM) storing thereon, computer-executable instructions that, when executed by a processor, cause the processor to perform operations, the operations comprising:
  querying a network function repository function (NRF), the NRF being one of a plurality of NRFs belonging to a group of NRFs;
  registering one or more network functions (NFs) with the NRF;
  maintaining, by the NRF, status information of the one or more NFs registered to the NRF;
  querying, by an NF registered to one of the plurality of NRFs and requiring a service provided by another NF, one or more NRFs of the plurality of NRFs for an available NF capable of providing the required service; and
  discovering, by the NF registered to the one of the plurality of NRFs, the available NF capable of providing the required service based on the status information of the available NF capable of providing the required service maintained at the one or more NRFs of the plurality of NRFs.

16. The non-transitory CRM of claim 15, wherein the plurality of NRFs are synchronized to each other, each NRF of the plurality of NRFs having one or more corresponding NFs registered to it, and the group of NRFs is one of a plurality of groups of NRFs.

17. The non-transitory CRM of claim 16, wherein the operations further comprise:
  collecting information associated with querying of NFs by another NF;
  sending statistical data based on the collected information to a user interface (UI); and
  causing the UI to display the statistical data.

18. The non-transitory CRM of claim 17, wherein the statistical data includes at least one of:
  discovery data,
  registration data,
  security data,
  status notification data,
  NF subscription data, or
  status update data.

19. The non-transitory CRM of claim 15, wherein each of the plurality of NRFs is associated with a corresponding geographical region and having data associated with the corresponding geographical region, and the operations further comprise:
  querying one or more of the plurality of NRFs;
  aggregating the data associated with corresponding geographical regions from the one or more of the plurality of NRFs; and
  providing a combined representation of information based on the aggregated data.

20. The non-transitory CRM of claim 19, wherein the operations further comprise:
  sending, by an NF, information associated with load and capacity of the NF to an NRF with which the NF is registered;
  updating the NRF by the NF based on the information, updating the NRF including de-registering, by the NF, from the NRF;
  aggregating, by the NRF, the status information of the one or more corresponding NFs registered to the NRF;
  sending, by the NRF, the aggregated status information to a user interface (UI); and
  causing the UI to display the aggregated status information.

* * * * *